United States Patent
Kim et al.

(10) Patent No.: US 8,867,666 B2
(45) Date of Patent: Oct. 21, 2014

(54) DEVICE AND METHOD SUPPORTING MULTI-CARRIER WAVES

(75) Inventors: So Yeon Kim, Anyang-si (KR); Jae Hoon Chung, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 375 days.

(21) Appl. No.: 13/148,277

(22) PCT Filed: Feb. 5, 2010

(86) PCT No.: PCT/KR2010/000724
§ 371 (c)(1),
(2), (4) Date: Sep. 1, 2011

(87) PCT Pub. No.: WO2010/090477
PCT Pub. Date: Aug. 12, 2010

(65) Prior Publication Data
US 2011/0305290 A1   Dec. 15, 2011

Related U.S. Application Data

(60) Provisional application No. 61/150,316, filed on Feb. 6, 2009, provisional application No. 61/157,881, filed on Mar. 5, 2009.

(30) Foreign Application Priority Data

Feb. 5, 2010   (KR) .................. 10-2010-0010961

(51) Int. Cl.
*H04B 7/02* (2006.01)
*H04L 5/00* (2006.01)

(52) U.S. Cl.
CPC ............ *H04L 5/0007* (2013.01); *H04L 5/0098* (2013.01); *H04L 5/0096* (2013.01); *H04L 5/0064* (2013.01); *H04L 5/0037* (2013.01); *H04L 5/0087* (2013.01)
USPC ............................ 375/316; 370/329; 370/203

(58) Field of Classification Search
CPC ... H04L 5/0098; H04L 5/0096; H04L 5/0055; H04L 5/0057; H04L 5/0007; H04L 5/0037; H04L 1/0026; H04W 76/048; H04W 76/046
USPC .................. 375/316; 370/329, 203, 208, 343; 455/450, 464
See application file for complete search history.

(56) References Cited

U.S. PATENT DOCUMENTS

| 2006/0153061 A1 | 7/2006 | Nishio |
| 2007/0066340 A1 | 3/2007 | Yoon et al. |

(Continued)

FOREIGN PATENT DOCUMENTS

| CN | 1894864 | 1/2007 |
| CN | 101268635 | 9/2008 |

OTHER PUBLICATIONS

3GPP TS 36.321 V8.0.0, 3rd Generation Partnership Project; Technical Specification Group Radio Access Network; Evolved Universal Terrestrial Radio Access (E-UTRA) Medium Access Control (MAC) protocol specification (Release 8), Dec. 2007.*

(Continued)

*Primary Examiner* — Aristocratis Fotakis
(74) *Attorney, Agent, or Firm* — Lee, Hong, Degerman, Kang & Waimey

(57) ABSTRACT

Provided are a device and method supporting multi-carrier waves. The device comprises: a multi-carrier control unit for receiving carrier wave allocation data including data relating to allocated carrier waves and deactivating a portion of the carrier waves included in the carrier wave allocation data or else receiving carrier wave control data including data relating to additional carrier waves; and a multi-carrier operation unit which operates using multiple carrier waves allocated on the basis of the carrier wave allocation data and the carrier wave control data. The base station scheduling burden can be reduced and the power consumption of the terminal can be reduced.

6 Claims, 17 Drawing Sheets

(56) References Cited

U.S. PATENT DOCUMENTS

| | | | |
|---|---|---|---|
| 2007/0264936 A1 | 11/2007 | Kim et al. | |
| 2008/0298322 A1* | 12/2008 | Chun et al. | 370/335 |
| 2009/0011718 A1* | 1/2009 | Chun et al. | 455/70 |
| 2009/0047912 A1* | 2/2009 | Lee et al. | 455/69 |
| 2009/0073958 A1* | 3/2009 | Xu | 370/352 |
| 2009/0238098 A1* | 9/2009 | Cai et al. | 370/254 |
| 2009/0245169 A1* | 10/2009 | Zhang et al. | 370/328 |
| 2009/0253470 A1* | 10/2009 | Xu | 455/574 |
| 2010/0118720 A1* | 5/2010 | Gauvreau et al. | 370/252 |
| 2010/0118836 A1* | 5/2010 | Kazmi et al. | 370/336 |
| 2010/0124291 A1* | 5/2010 | Muharemovic et al. | 375/260 |
| 2010/0135237 A1* | 6/2010 | Papasakellariou et al. | 370/329 |
| 2010/0172290 A1* | 7/2010 | Nam et al. | 370/328 |

OTHER PUBLICATIONS

The State Intellectual Property Office of the People's Republic of China Application Serial No. 201080012156.1, Office Action dated Jun. 4, 2014, 6 pages.

* cited by examiner

DEVICE AND METHOD SUPPORTING MULTI-CARRIER WAVES

CROSS-REFERENCE TO RELATED APPLICATIONS

This application is the National Stage filing under 35 U.S.C. 371 of International Application No. PCT/KR2010/000724, filed on Feb. 5, 2010, which claims the benefit of earlier filing date and right of priority to Korean Application No. 10-2010-0010961, filed on Feb. 5, 2010, and also claims the benefit of U.S. Provisional Application Ser. Nos. 61/157,881, filed on Mar. 5, 2009 and 61/150,316, filed on Feb. 6, 2009, the contents of which are all hereby incorporated by reference herein in their entirety.

TECHNICAL FIELD

The present disclosure relates to radio communication, and more particularly, to a device and a method supporting multi-carrier waves.

BACKGROUND ART

3rd generation partnership project long term evolution (3GPP LTE) based on 3GPP technical specification (TS) release 8 is a promising next-generation mobile communication standard.

In a general radio communication system, even though a bandwidth between uplink and downlink is configured to be different from each other, only a single carrier is mainly considered. Based on the single carrier even in the 3rd generation partnership project long term evolution (3GPP LTE), the number of carriers configuring the uplink and the downlink each is one and the bandwidth of the uplink and the bandwidth of the downlink are generally symmetric with each other.

However, it is not easy to assign a large-bandwidth frequency, except for some regions worldwide. Therefore, as a technology for effectively using a broken small band, a spectrum aggregation technology exhibiting an effect similar to a technology of using logically large band by physically binding a plurality of bands in a frequency region has been developed.

For the spectrum aggregation, for example, even though the 3GPP LTE supports a bandwidth up to 20 MHz, the 3GPP LTE includes a technology of supporting a system bandwidth of 100 MHz using multi-carrier and assigning an asymmetric bandwidth between the uplink and the downlink.

Even though a base station supports the multi-carrier, the number of carriers supported by user equipments is generally limited. Alternatively, carriers assigned to the user equipments may be changed according to an amount of data to be transmitted.

There is a need for assigning multiple carriers more effectively.

DISCLOSURE

Technical Problem

An aspect of the present invention is to provide a device and a method supporting multiple carrier.

Another aspect of the present invention is to provide a device and a method changing assigned carriers.

Technical Solution

In an aspect, a multiple carrier control device includes a multiple carrier control unit configured for receiving carrier wave allocation information including information relating to assigned carriers and receiving carrier assignment information including information relating to add or deactivate a carrier among the assigned carriers included in carrier assignment information, and a multiple carrier operation unit configured for performing multiple-carrier operation using the assigned carriers based on the carrier assignment information and the carrier control information.

A reception period of the carrier assignment information may be longer than a reception period of the carrier control information.

The multiple carrier control unit may be configured for transmitting a reception acknowledgment of the carrier control information.

The carrier control information may further include information on a valid time of the deactivated or added carrier.

The carrier control information may be received as a medium access control (MAC) message.

The carrier control information may be received through a physical channel within a control region of a subframe.

The multiple carrier operation unit may be configured for monitoring a physical downlink control channel (PDCCH) on an activated carrier based on the carrier assignment information and the carrier control information.

In another aspect, a multiple carrier configuration device includes a multiple carrier assignment unit configured for transmitting carrier wave allocation information including information relating to assigned carriers and transmitting carrier assignment information including information relating to add or deactivate a carrier among the assigned carriers included in carrier assignment information, and a multiple carrier operation unit configured for performing multiple-carrier operation using the assigned carriers based on the carrier assignment information and the carrier control information.

Advantageous Effects

A base station can more flexibly assign carriers to a user equipment. Therefore, durden due to scheduling can be reduced and resources can be utilized more effectively. The user equipment can perform blind decoding only on the necessary carrier, thereby reducing a power consumption and a reception complexity.

MODE FOR INVENTION

Figure 1:
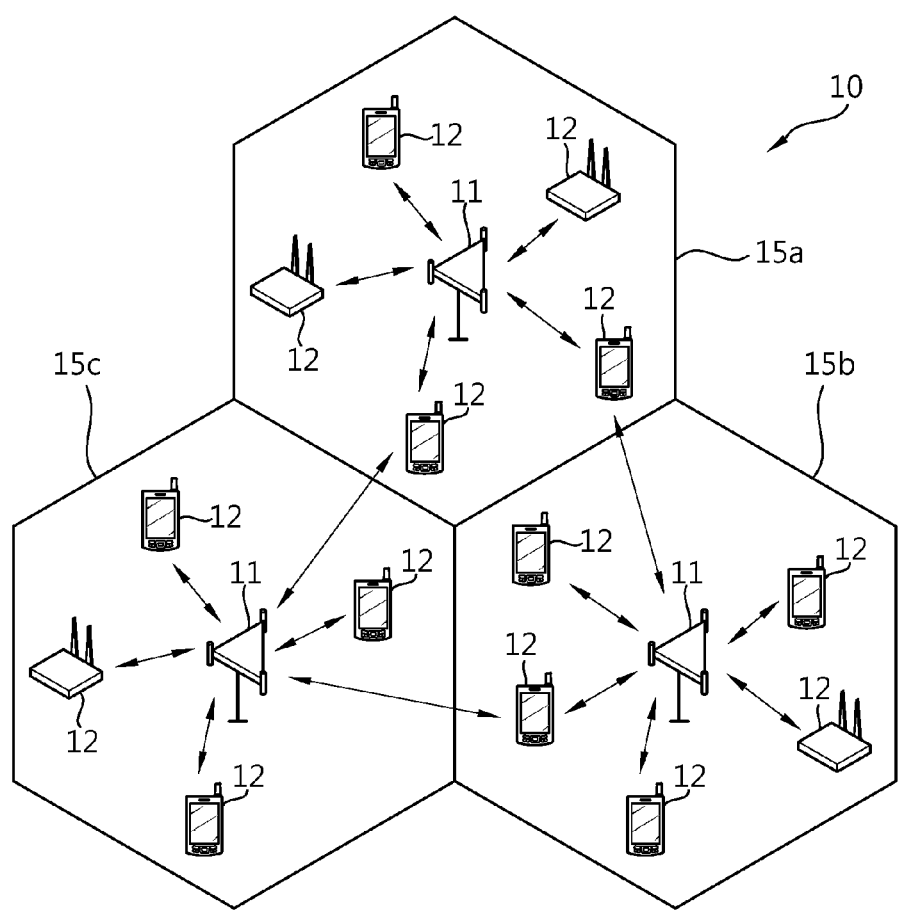
FIG. 1 is a diagram showing a wireless communication system.

FIG. 1 shows a wireless communication system. A wireless communication system 10 includes at least one base station (BS) 11. Each base station 11 provides communication services to specific geographical areas (generally, referred to as a cell) 15*a*, 15*b*, and 15*c*. A cell may again be divided into a plurality of regions (referred to as a sector).

An user equipment (UE) 12 may be fixed or have mobility and may be referred to as other terms, such as a mobile station (MS), a mobile terminal (MT), a user terminal (UT), a subscriber station (SS), wireless devices, personal digital assistants (PDAs), wireless modems, handheld devices, or the like.

The base station (BS) 11 is generally referred to as a fixed station communicating with the user equipment 12 and may be referred to as other terms, such as an evolved-node B (eNB), a base transcriber system (BTS), an access point, or the like.

Hereinafter, downlink (DL) means communication from the base station to the user equipment and uplink (UL) means communication from the user equipment to the base station. In the downlink, a transmitter may be a portion of the base station and a receiver may be a portion of the user equipment. In the uplink, the transmitter may be a portion of the user equipment and the receiver may be a portion of the base station.

Figure 2:
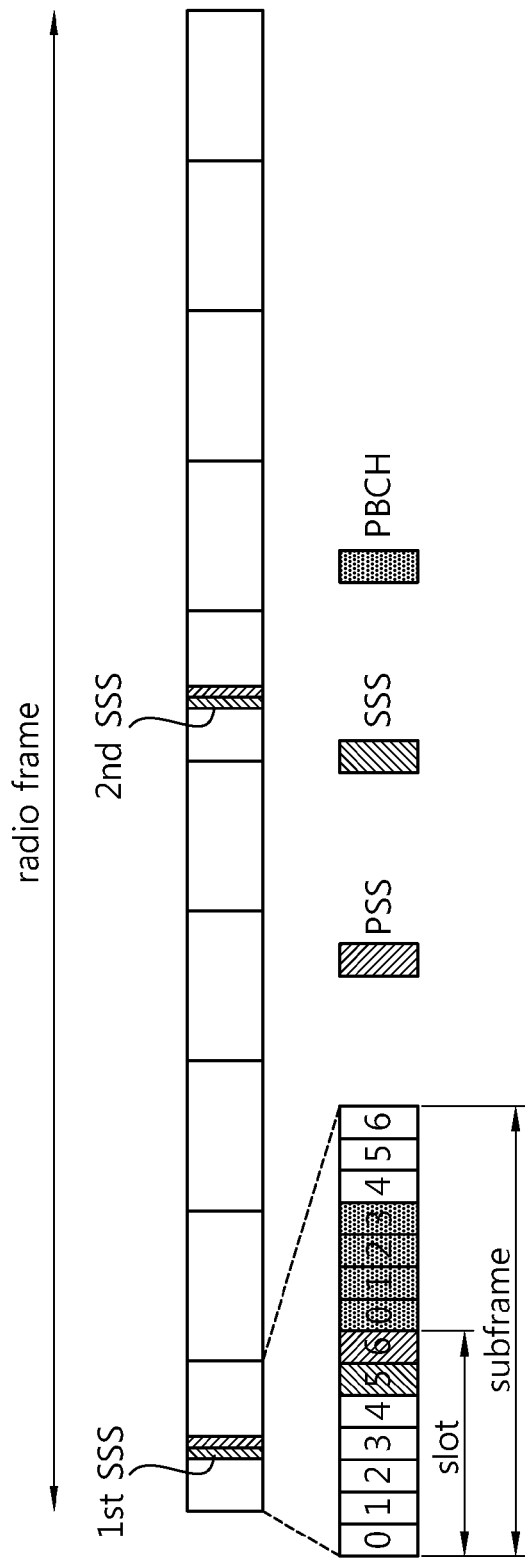
FIG. 2 is a diagram showing a structure of a radio frame in the 3GPP LTE.

FIG. 2 shows a structure of a radio frame in the 3GPP LTE. This may refer to section 6 of 3GPP TS 36.211 V8.5.0 (2008-December). A radio frame includes 10 subframes to which indexes of 0 to 9 are assigned. One subframe is configured to include two slots. Time to transmit one subframe is referred to as transmission time interval (TTI). For example, an interval of one subframe may be 1 ms and an interval of one slot may be 0.5 ms.

One slot may include a plurality of orthogonal frequency division multiplexing (OFDM) symbols in time domain. The OFDM symbol, which is to represent one symbol period since the 3GPP LTE uses the OFDMA in the downlink, may be referred to other names. For example, the SC-FDMA is used in an uplink multiple access method, which may be referred to as the SC-FDMA symbol.

Although a case in which one slot includes 7 OFDM symbols is exemplarily described, the number of OFDM symbols included in one slot may vary according to a length of cyclic prefix (CP). According to 3GPP TS 36. 211, one subframe includes 7 OFDM symbols at normal CP and one subframe includes 6 OFDM symbols at extended CP.

A primary synchronization signal (PSS) is transmitted to a first slot (a first slot of a first subframe (a subframe of which the index is 0)) and a last OFDM symbol of an eleventh slot (a first slot of a sixth subframe (a subframe of which the index is 5)). The PSS is used to obtain OFDM symbol synchronization or slot synchronization and is associated with physical cell identity (ID). A primary synchronization code (PSC) is a sequence used for the PSS and the 3GPP LTE includes three PSCs. One of the three PSCs is transmitted to the PSS according to the cell ID. Each of the last OFDM symbols of the first slot and the eleventh slot uses the same PSC.

A secondary synchronization signal (SSS) includes a first SSS and a second SSS. The first SSS and the second SSS are transmitted at OFDM symbols adjacent to the OFDM symbol transmitted by the PSS. The SSS is used to obtain the frame synchronization. The SSS is used to obtain the cell ID, together with the PSS. The first SSS and the second SSS use different secondary synchronization codes (SSC). When each of the first SSS and the second SSS includes 31 subcarriers, two SSCs having a length of 31 is used for the first SSS and the second SSS.

A physical broadcast channel (PBCH) is transmitted at four preceding OFDM symbols of a second slot of the first subframe. The PBCH carries system information essential to communicate the user equipment with the base station and the system information transmitted through the PBCH may be referred to as a master information block (MIB). Compared with this, the system information transmitted through a physical downlink control channel (PDCCH) may be referred to as a system information block (SIB).

As described in 3GPP TS 36.211 V8.5.0 (2008-December) "Evolved Universal Terrestrial Radio Access (E-UTRA); Physical Channels and Modulation (Release 8)", the LTE divides a physical channel into a data channel, i.e., a physical downlink shared channel (PDSCH) and a physical uplink shared channel (PUSCH) and a control channel, i.e., a physical downlink control channel (PDCCH) and a physical uplink control channel (PUCCH).

Figure 3:
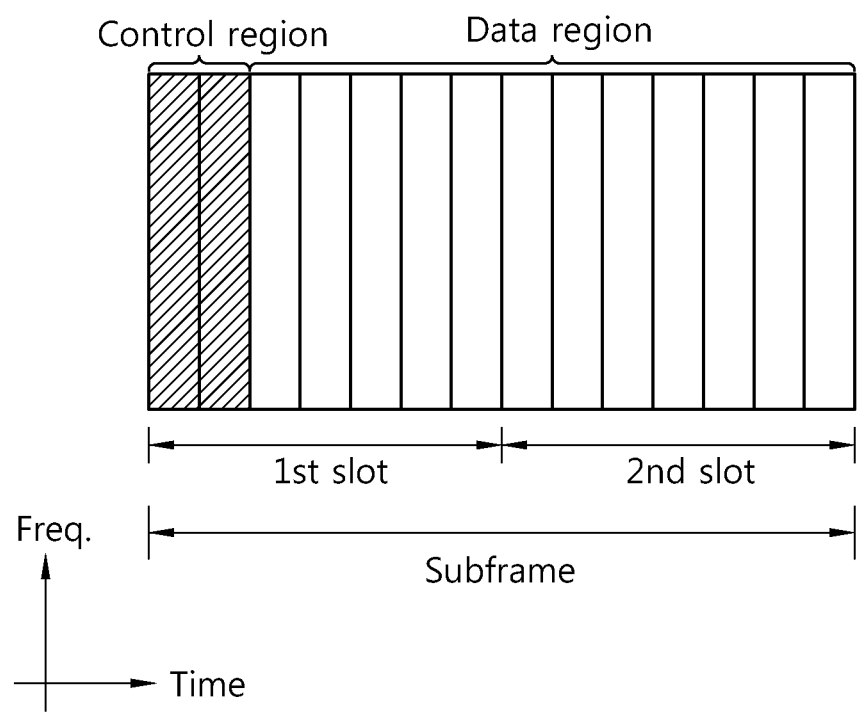
FIG. 3 is a diagram showing a structure of a downlink subframe in the 3GPP LTE.

FIG. 3 is a diagram showing a structure of a downlink subframe in the 3GPP LTE. The subframe is divided into a control region and a data region in a time domain. The control region includes a maximum of three preceding OFDM symbols of the first slot within the subframe, but the number of OFDM symbols included in the control region may be changed. The PDCCH is assigned to the control region and the PDSCH is assigned to the data region.

The PDCCH may carry resource assignment (referred to as a downlink grant) of the PDSCH, resource assignment (referred to as an uplink grant) of the PUSCH, a set of transmission power control commands for each UE within any UE group, activation of voice over internet protocol (VoIP), or the like.

As described in section 9 of 3GPP TS 36.213 V8.5.0 (2008-December) "Evolved Universal Terrestrial Radio Access (E-UTRA); Physical Layer Procedures (Release 8)", blind decoding is used to monitor the PDCCH.

The PDCCH region within the control region is divided into a common search space and a UE-specific search space for monitoring the PDCCH. The common search space is a search space for monitoring the PDCCH for common control information and the UE-specific search space is a search space for monitoring the PDCCH for UE-specific control information.

Hereinafter, a multiple carrier system will be described.

The 3GPP LTE system supports the case in which a downlink bandwidth and an uplink bandwidth are configured to be different from each other, which premises a single component carrier (CC). The 3GPP LTE supports only the case in which the bandwidth of the downlink and the bandwidth of the uplink are same or different to or from each other, under conditions that the single component carriers are each defined for the downlink and the uplink, respectively. For example, the 3GPP LTE system may support a maximum of 20 MHz and have different uplink bandwidth and downlink bandwidth, but supports only the single component carrier in the uplink and the downlink.

The spectrum aggregation (alternatively, referred to as bandwidth aggregation, carrier aggregation) is to support a plurality of component carriers. The spectrum aggregation is introduced to support increasing throughput, prevents cost increase due to the introduction of a broadband radio frequency (RF) device, and secure compatibility with the existing systems. For example, a bandwidth of a maximum of 100 MHz may be supported when five component carriers are assigned as granularity in a carrier unit having, for example, a bandwidth of 20 MHz.

The spectrum aggregation may be classified into contiguous spectrum aggregation that is performed between continuous carriers in frequency domain and non-contiguous spectrum aggregation that is performed between discontinuous carriers. The number of carriers aggregated between the downlink and the uplink may be configured to be different from each other. The case in which the number of downlink carriers and the number of uplink carriers are equal to each other may be referred to as symmetric aggregation and the case in which the number of downlink carriers and the number of uplink carriers are different from each other may be referred to as asymmetric aggregation.

In addition, a size (that is, a bandwidth) of the component carriers may be different from each other. For example, when five component carriers are used to configure a 70 MHz band, the five component carriers may be configured, like 5 MHz carrier (carrier #0)+20 MHz carrier (carrier #1)+20 MHz carrier (carrier#2)+20 MHz carrier (carrier #3)+5 MHz carrier (carrier#4).

Hereinafter, the multiple carrier system is referred to as a system that supports a plurality of carriers based on the spectrum aggregation. In the multiple carrier system, the contiguous spectrum aggregation and/or the non-contiguous spectrum aggregation may be used and either of the symmetric aggregation or the asymmetric aggregation may also be used.

At least one medium access control (MAC) entity may manage/operate at least one carrier so as to be transmitted and received. The MAC entity has an upper layer of a physical layer (PHY). For example, the MAC entity may be implemented to have the MAC layer and/or the upper layer thereof.

Figure 4:
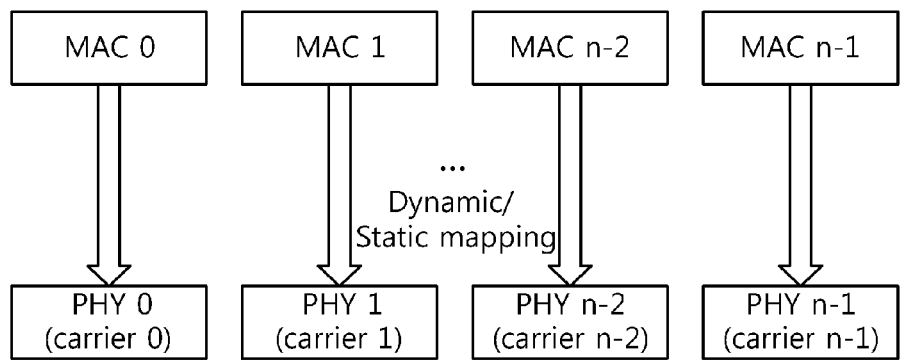
FIG. 4 is a diagram showing an example of a transmitter for a multi MAC to operate multiple carriers.
Figure 5:
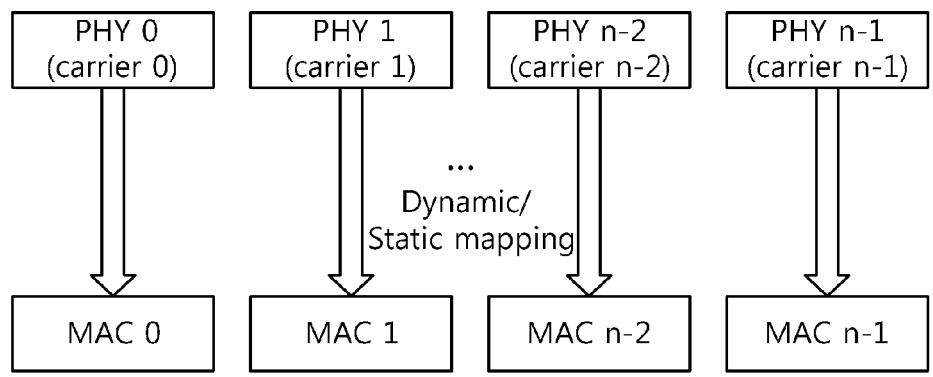
FIG. 5 is a diagram showing an example of a receiver for a multi MAC to operate multiple carriers.

FIG. 4 shows an example of a transmitter for the multiple MAC to operate the multi-carrier waves and FIG. 5 shows an example of a receiver for the multiple MAC to operate the multi-carrier waves. A plurality of MAC entities MAC0, . . . , MAC n−1 are respectively mapped one to one to a plurality of physical layers PHY0, . . . , PHY n−1.

Figure 6:
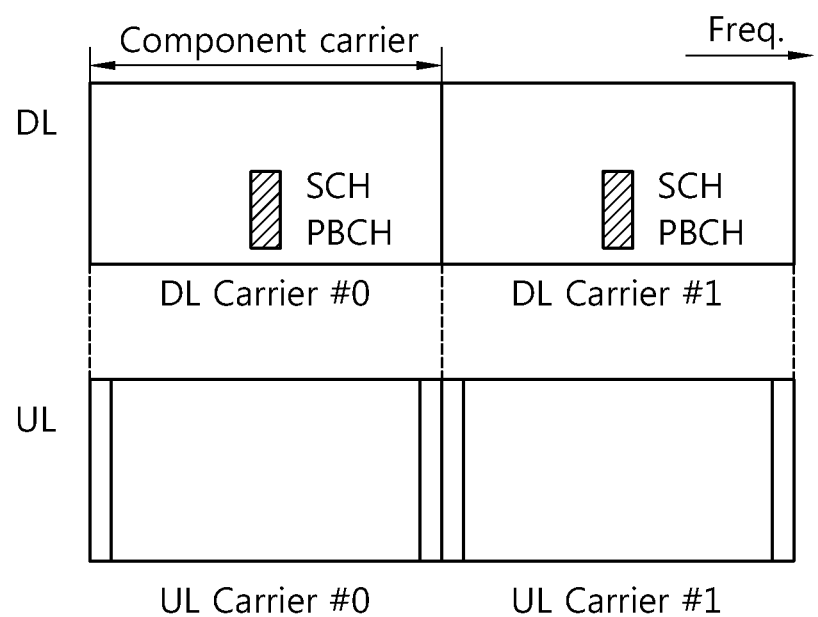
FIG. 6 is a diagram showing an example of symmetric aggregation.
Figure 7:
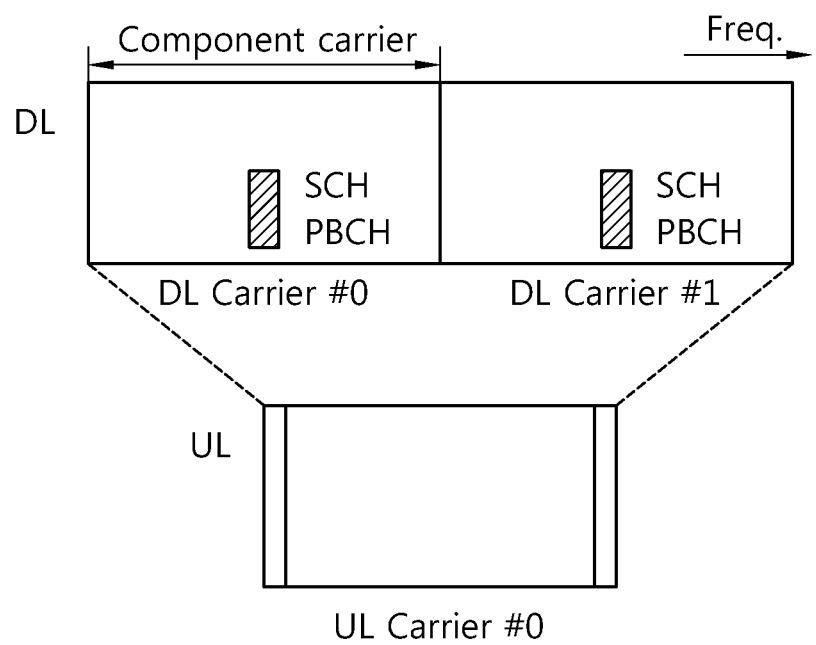
FIG. 7 is a diagram showing an example of asymmetric aggregation.

FIG. 6 shows an example of the symmetric aggregation and FIG. 7 shows an example of the asymmetric aggregation. In the symmetric aggregation, the number of UL component carriers (UL CC) and the number of DL component carriers (DL CC) each are 2. In the asymmetric aggregation, the number of UL component carriers is 1, while the number of DL component carriers is 2.

Figure 8:
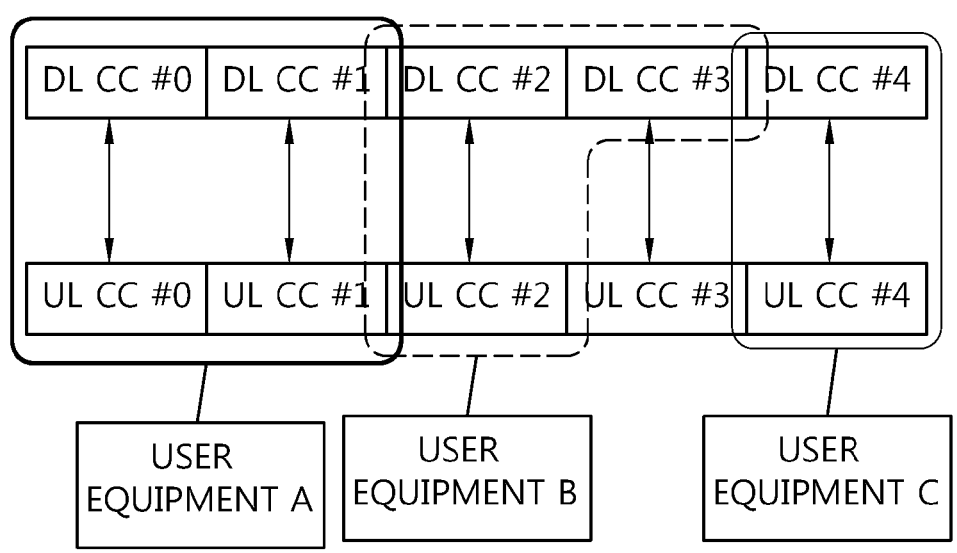
FIG. 8 is a diagram showing an example of assigning carriers to each user equipment.

FIG. 8 is a diagram showing an example of assigning carriers to each user equipment. The carrier aggregation may be configured to be different from each other for each cell and may be configured according to the capability of the UEs within any cell. The user equipments may be symmetrically or asymmetrically assigned with at least one DL CC and UL CC according to the capability of the user equipments.

It is assumed that five DL CCs and five UL CCs are operated in any cell. DL CC #0, DL CC #1, UL CC #0, and UL C C#1 are assigned to user equipment A, DL CC #2, DL CC #3, UL CC #2 are assigned to user equipment B, DL CC #4 and UL CC #4 are assigned to user equipment C. In this configuration, user equipment C to which one DL CC and one UL CC is assigned may be a user equipment that supports only the existing LTE release 8.

Since the carrier configuration between the cell and the user equipment may be different from each other, the user equipment may need UE-specific carrier assignment information. Further, when the cell-specific carrier configuration is symmetric in any cell, there is a need for the user equipment to obtain accurate DL-UL linkage information so as to support the user equipment using the asymmetric carrier configuration within the cell.

The UL-DL linkage information means linkage information between the DL CC and the UL CC corresponding to the DL CC. For example, the UL-DL linkage information may be information regarding the linkage between a DL CC by which a transport block is transmitted and a UL CC by which a hybrid automatic repeat request (HARQ) ACK/NACK signal for the transport block is transmitted. The UL-DL linkage information may be information regarding the linkage between a DL CC by which an uplink grant is received and a UL CC by which a PUSCH indicated by the uplink grant is transmitted.

Each transport block is a unit of a data packet that is mapped to the single CC.

Figure 9:
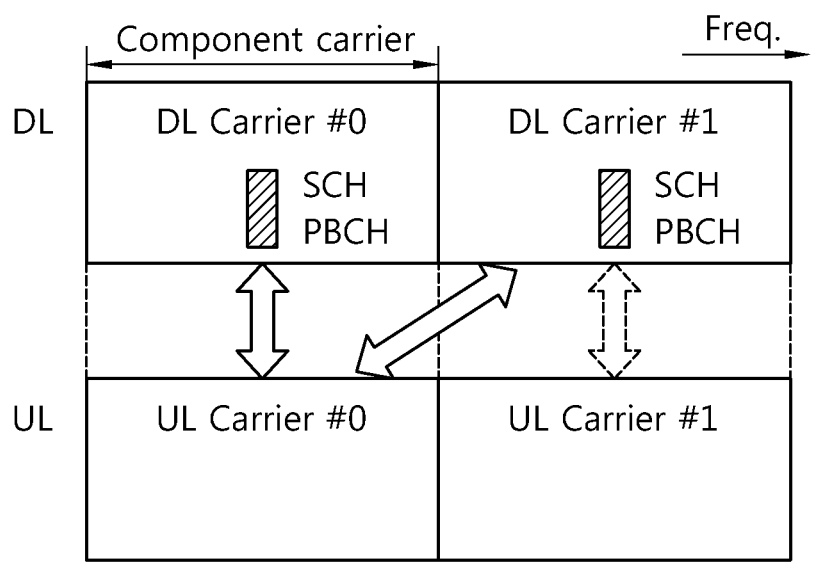
FIG. 9 is a diagram showing an example of asymmetric carrier assignment.

FIG. 9 is a diagram showing an example of asymmetric carrier assignment. It is assumed that the symmetric carrier configuration of two DL CCs and two UL CCs is defined in the cell. The DL CC #0 is linked with the UL CC #0 and the DC CC #1 is linked with the UL CC #1. When the user equipment supporting 2 DL CCs and 1 UL CC accesses the corresponding cell, the asymmetric carrier may be assigned to the user equipment. For example, the DL CC #0 is linked with the UL CC #0 and the DL CC #1 is linked with the UL CC #0.

The carrier assignment information may be transmitted to the user equipment through a radio resource control (RRC) message or a semi-static message such as the system information.

Figure 10:
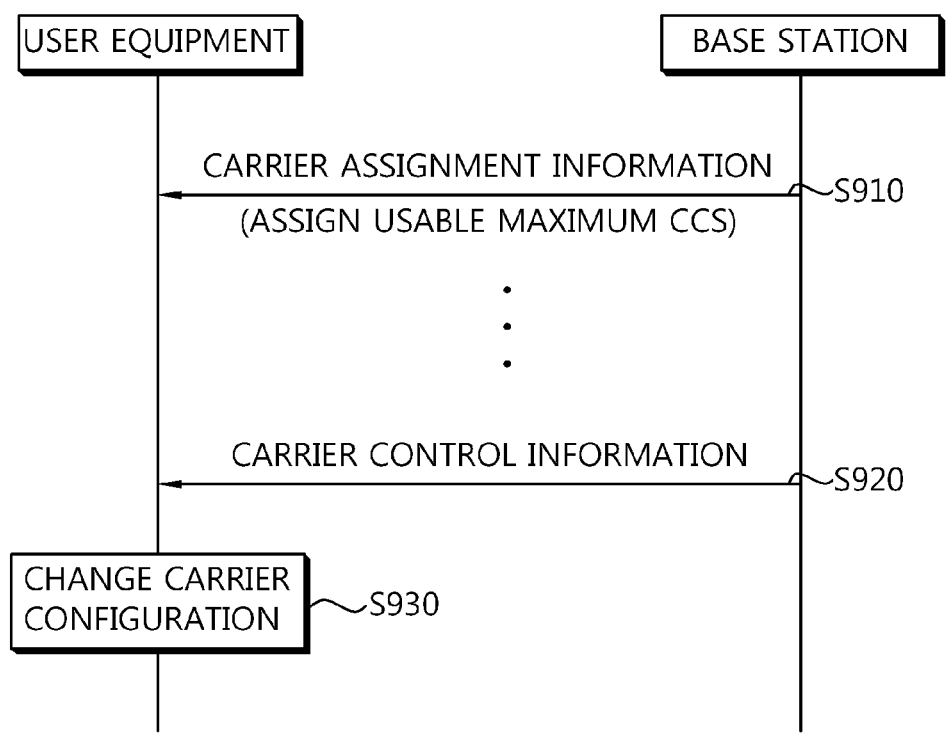
FIG. 10 is a flow chart showing a multi-carrier operation according to an exemplary embodiment of the present invention.

FIG. 10 is a flow chart showing a multiple carrier operation according to an exemplary embodiment of the present invention.

At step S910, a base station transmits UE-specific carrier assignment information to an user equipment. The carrier assignment information includes information on a maximum of CC that may be used by the user equipment. Alternatively, the carrier assignment information may include the information on more CCs than a minimum of CCs that may be used by the user equipment. The carrier assignment information may include parameters such as a CC index indicating the CCs that may be used by the user equipment.

The carrier assignment information may be transmitted through the semi-static message such as the RRC message.

At step S920, the base station transmits carrier control information to the user equipment. The carrier control information is information that changes or overrides the carrier assignment included in the carrier assignment information. The carrier control information includes information that deactivates or activates some or all of the carriers among the carriers assigned through the carrier assignment information.

At step S930, the user equipment changes the carrier configuration based on the carrier control information and then, performs the operation using the multiple carriers. The user equipment transmits a reception acknowledgment of the carrier control information to the base station and then, changes the carrier configuration.

It is assumed that there are the single transport block (TB) and the single HARQ entity in the single component carrier when supporting the broad band using the carrier aggregation. It is assumed that three DL CCs and three UL CCs are assigned through the UE-specific carrier assignment information to the UE. Since the PDCCH and/or the PDSCH may be transmitted through all of the three DL CCs, the UE performs the blind decoding for searching the PDCCH in all of the three DL CCs. In addition, the UE reports the feedback information such as a channel quality indicator (CQI), a precoding matrix indicator (PMI), and a rank indicator (RI) for all of the three DL CCs to the base station.

However, the number of TBs to be transmitted to the corresponding UE may be fewer than the number of carriers included in the UE-specific carrier assignment information semi-statically assigned. For example, when the three DL CCs are semi-statically assigned to the UE, the three TBs may not be transmitted at all times but only one or two TBs may be transmitted. As shown in FIG. 4, when each MAC entity corresponds to each component carrier, the number of TBs may be fewer than the number of assigned component carriers in the case in which the TB, for example, an MAC protocol data unit (MAC PDU) is not transmitted from at least one of the plurality of MAC entities to the physical layer. This may be due to the empty buffer of the MAC entity or the command from the upper layer. The state of the MAC entity that does not transmit the TB may be referred to 'MAC OFF'. This may be similarly generated even in the downlink and the uplink.

Even when the number of TBs to be transmitted to the corresponding UE is fewer than the number of carriers included in the UE-specific carrier assignment information, performing the blind decoding on all the component carriers always assigned by the UE increases only the decoding complexity. Further, reporting the feedback information to all the assigned component carriers increase the feedback overhead.

When the number of TBs substantially transmitted is fewer than the number of carriers assigned by the carrier assignment information, the case in which the UE-specific carrier assignment information overrides through the carrier control information may be more effective. For example, even though each of the three DL, CCs and UL CCs are assigned by the UE-specific carrier assignment information, the carrier assignment information overrides so that the UE monitors only the reduced number of component carriers when the number of TBs fewer than 3 are transmitted. Overriding the carrier assignment information means that at least one DL/UL CCs assigned by the carrier assignment information is partially activated through the carrier control information as it is and the remaining may be deactivated.

When the carrier assignment information overrides, the user equipment may monitor the PDCCH for only the component carrier (referred to as active CC) transmitted by the actual TB, thereby reducing the complexity according to the blind decoding. In addition, the feedback information is transmitted to only the DL CC actually transmitted by the TB, thereby reducing the overhead. Alternatively, a subband (SB) CQI and a wideband (WB) CQI may be reported to the active CC and only the WB CQI may be reported to the deactive CC.

A method transmitting the carrier control information overriding the carrier assignment information will now be described. The carrier control information may be used to override the carrier assignment information or deactivate/activate the assigned carriers or may also be used to assign UE-specifically the carriers.

The carrier control information is information informing the configuration of the carrier aggregation to the specific UE or the group of the UEs. The carrier control information may include the information regarding the uplink carrier aggregation and/or the downlink carrier aggregation.

The carrier control information may be transmitted for carrier management at a shorter period than the RRC message.

The period of the carrier control information may be dynamic. The carrier control information may be transmitted for each subframe or in an event-driven state. In this case, there is no reception acknowledgement of the carrier control information. Even though the UE does not normally receive the carrier control information in any subframe, since the new carrier control information is transmitted in the just next subframe, the reception errors of the carrier control information have an effect only in the corresponding subframe.

The period of the carrier control information may be semi-dynamic. The carrier control information is transmitted at a period larger than one subframe but the just previous carrier control information is used for the corresponding period. Since the carrier control information is not transmitted for each subframe, thereby reducing the resource overhead according to the transmission of the carrier control information. However, the UE does not normally receive the carrier control information, which has a largely negative effect on the operation of the UE within the corresponding period. Therefore, the transmission reliability is very important.

When the carrier control information is semi-statically transmitted, the UE may transmit a reception acknowledgement for the carrier control information to the base station. Like a HARQ ACK/NACK signal, the reception acknowledgement may be represented by ACK when the reception is successful and represented by NACK when the reception fails. Alternatively, when the reception is successful, the reception acknowledgement may not be transmitted and when the reception fails, the reception acknowledgement may be transmitted, and vice versa.

The UE receiving the carrier control information may confirm the reception errors of the carrier control information by a method similar to the cyclic redundancy check (CRC) error confirmation.

When the UE receives the carrier control information in an n-th subframe, the reception acknowledgement may be transmitted at an n+k−th (k≥1) subframe.

The reception acknowledgement of the carrier control information may utilize the existing PUCCH format. For example, PUCCH format 1 used to transmit the HARQ ACK/NACK signal may use an additional bit or may use other resources (orthogonal sequence, cyclic shift, or the like).

The carrier control information may be information related to the situation or scheduler of the MAC while being the information on the component carrier receiving/transmitting the control channel and/or the data channel. The carrier control information may be information that activates or deactivates some or all of the previously assigned component carriers.

The carrier control information may be transmitted in the control region of the subframe.

The carrier control information may be transmitted through a dedicated channel. The dedicated channel means a separately defined channel rather than the PDCCH. The dedicated channel may be assigned before or after the region in which the PDCCH is transmitted in the subframe.

In order to define the dedicated channel, a separate identifier for monitoring the channel is defined, which may be masked to the CRC of the carrier control information.

The dedicated channel may be monitored within the common search space. Alternatively, the dedicated channel may be monitored within the UE-specific search space. The transmission channel may be transmitted by being limited to the specific position, like the first and last UE-specific search spaces.

When the carrier control information is transmitted through the dedicated channel, the backward compatibility may be secured without affecting the existing LTE user equipment.

The carrier control information may be transmitted through the specific carrier. The carrier transmitting the carrier control information may be defined to be the cell-specific, the UE-specific, and the UE group-specific. The carrier control information may be transmitted only in the carrier that is not compatible with the LTE. The carrier control information may be transmitted through a primary carrier.

The carrier control information may be transmitted through the PDCCH. To this end, the carrier control information may newly define an included DCI format or may reuse a field within the existing DCI format as the carrier control information. According to the method, the carrier control information is transmitted within the PDCCH error range. Further, even though the error is generated, since the PDCCH itself is the dynamic transmission, the method may minimize the error propagation.

When the base station semi-statically assigns the carrier used for the carrier aggregation to the UE through the carrier assignment information, the occurrence frequency in the emptied case without using all the assigned component carriers may be very few. Therefore, the carrier control information for overriding the carrier assignment information may be valid during the specific situation or for the limited period. The carrier control information includes the information on the valid time and may deactivate the corresponding carrier only in the valid time.

At the transmission timing of the carrier control information, the timing when the overriding is applied may be after several subframes. For example, the overriding for the downlink transmission may be applied from the subsequent subframe of the reception subframe of the carrier control information. Alternatively, when the reception is acknowledged, the UE transmits the reception acknowledgement of the carrier control information and then, the overriding may be applied from the downlink subframe after predetermined time lapses. The overriding for the uplink transmission may be applied from the fourth uplink subframe of the reception subframe of the carrier control information. Alternatively, when the reception is acknowledged, the UE transmits the reception acknowledgement of the carrier control information and then, the overriding may be applied from the uplink subframe after the predetermined time lapses.

A method transmitting the carrier control information through the MAC message will now be described.

Figure 11:
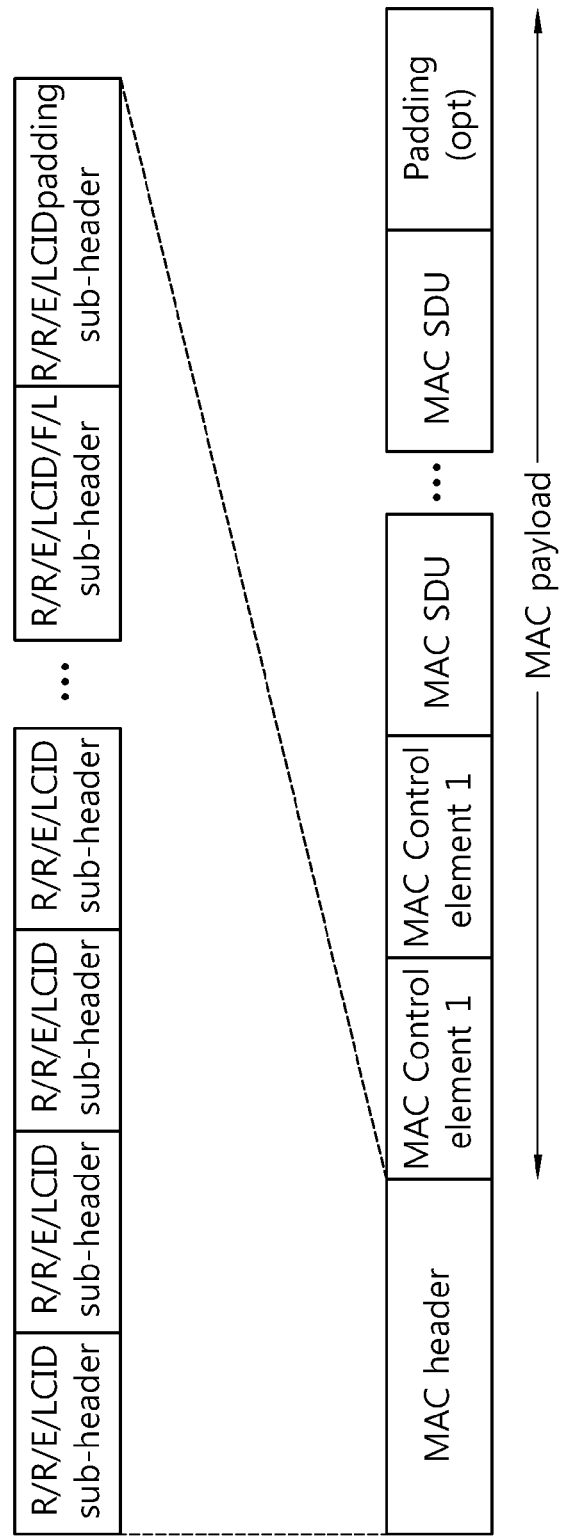
FIG. 11 is a diagram showing a format of an MAC PDU.

FIG. 11 shows a format of an MAC PDU. This may refer to section 6 of 3GPP TS 36.321 V8.4.0 (2008-December) "Evolved Universal Terrestrial Radio Access (E-UTRA); Medium Access Control (MAC) Protocol Specification (Release 8)".

An MAC PDU includes an MAC header, an MAC control element, and an MAC service data unit (MAC SDU). The MAC header and the MAC SDU have a variable size.

The MAC header includes an MAC sub header. Each MAC subheader corresponds to each MAC control element or each MAC SDU. The MAC subheader has the same sequence as the corresponding MAC SDU and MAC control element.

Figure 12:
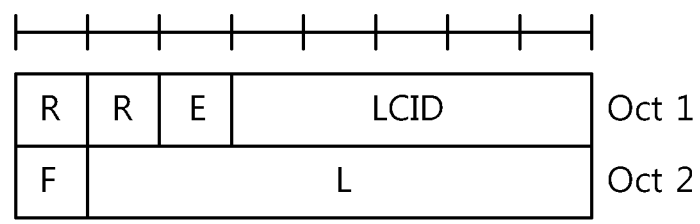
FIG. 12 is a diagram showing an example of an MAC subheader.
Figure 13:
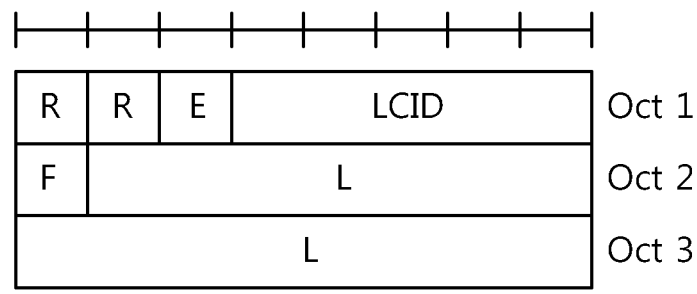
FIG. 13 is a diagram showing another example of the MAC subheader.
Figure 14:
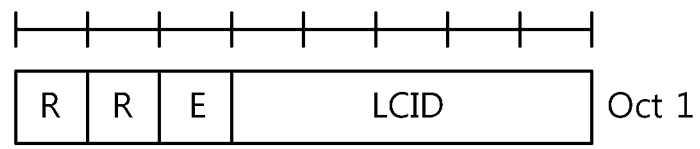
FIG. 14 is a diagram showing another example of the MAC subheader.

FIG. 12 shows an example of the MAC subheader. FIG. 13 shows another example of the MAC subheader. FIG. 14 shows another example of the MAC subheader.

A description of each field of the MAC subheader is as follows.

'LCID' is a logical channel of the corresponding MAC SDU or a logical channel ID field identifying a type of the corresponding MAC control element.

'L' is a length field indicating a length of the corresponding MAC SDU or MAC control element.

'F' is a format field indicating a size of the length field.

'E' is an extension field that is a flag indication whether more fields are present in the MAC header.

Each LCID field is present in the MAC SDU and the MAC control element that are included in the MAC PDU.

Table 1 represents a value of the LCID field defined in the 3GPP LTE.

TABLE 1

| Index | LCID values |
| --- | --- |
| 00000 | CCCH |
| 00001-01010 | Identity of the logical channel |
| 01011-11011 | Reserved |
| 11100 | UE Contention Resolution Identity |
| 11101 | Timing Advance Command |
| 11110 | DRX Command |
| 11111 | Padding |

'DRX command' is the LCID value identifying a discontinuous reception (DRX) command MAC control element. The DRX command MAC control element is the MAC control element instructing the UE so as to enter the DRX mode in an RRC idle state. In the DRX mode, the UE is woken in the monitoring period to monitor the PDCCH and does not monitor the PDCCH in a non-monitoring period.

The carrier control information may utilize the DRX command MAC control element. The DRX command may be configured for each UE. It is possible to control the assigned component carriers by activating/deactivating the DRX command for each component carrier. Alternatively, it is possible to commonly apply the DRX command to all of the carriers assigned to the UE. An inactivity timer value used for the DRX mode and/or a monitoring period value may be used as the valid time of the corresponding carrier.

The reserved index among the LCID values of Table 1 may be used to define the MAC control element for the carrier control information.

The MAC message including the carrier control information may be transmitted through the specific carrier. For example, the MAC message may be transmitted through the primary carrier receiving the system information.

The MAC message including the carrier control information may include the valid time, together with the information activating/deactivating the assigned carriers.

When the MAC message is used, since the size of information bits is not general limited and the normal HARQ operation is performed. Therefore, using the MAC message may be more effective than using the physical channel.

Figure 15:
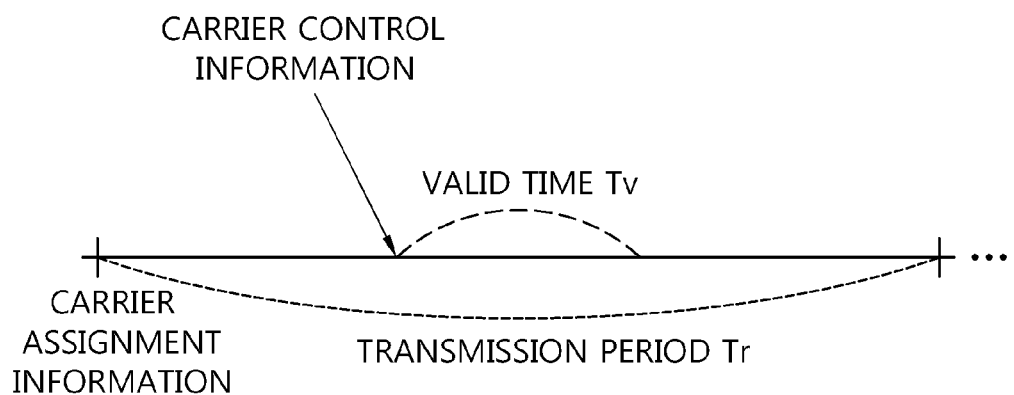
FIG. 15 is a diagram showing an example of applying carrier control information.

FIG. 15 shows an example of applying the carrier control information. The carrier assignment information is transmitted through the RRC message and the transmission period thereof is set to be Tr. The carrier control information instructs the corresponding carrier so as to be deactivated or so as to enter a 'sleep' mode. That is, the carrier control information offs some or all of the assigned carriers for the valid time Tv. The carrier control information may include the index of the carrier that is deactivated and/or valid time Tv.

The buffering and/or the PDCCH monitoring is not performed on the deactivated carriers for the valid time. Therefore, the reception complexity of the UE may be reduced and the power consumption may be reduced.

Figure 16:
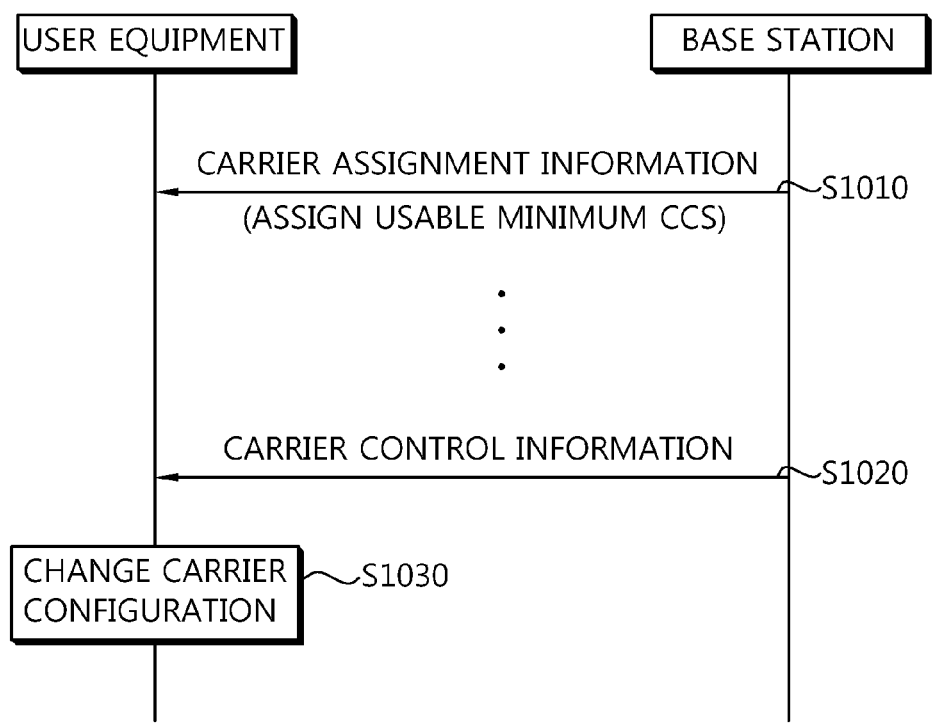
FIG. 16 is a flow chart showing a multi-carrier operation according to another exemplary embodiment of the present invention.

FIG. 16 shows a flow chart showing a multiple carrier operation according to another exemplary embodiment of the present invention.

At step S1010, the base station transmits the UE-specific carrier assignment information to the UE. The carrier assignment information includes information on a minimum of CC that may be used by the UE. Unlike the exemplary embodiment of FIG. 10, the base station assigns only one or the minimum number of CCs regardless of the carrier aggregation capability of the UE. The minimum number of CCs may be defined according to the capability of the UE.

When the base station assigns only one carrier to the UE through the carrier assignment information, the base station may configure only the one carrier as the primary carrier.

The carrier assignment information may be transmitted through the semi-static message such as the RRC message.

At step S1020, the base station transmits the carrier control information to the UE. The carrier control information is information that assigns or activates/deactivates additional carriers in addition the carriers included in the carrier assignment information. When it is insufficient to transmit the TBs by only CCs assigned to the UE, the additional DL CC and/or UL CC may be assigned for load balancing or interference coordination.

At step S1030, the UE changes the carrier configuration based on the carrier control information. The UE transmits the reception acknowledgment of the carrier control information to the base station and then, change the carrier configuration.

The carrier control information may be transmitted through the above-mentioned physical channel (dedicated channel or PDCCH) or the MAC message. However, the above-mentioned carrier control information of FIG. 10 makes the number of TBs to be transmitted fewer than the number of assigned component carriers to instruct the carrier so as to enter the deactive or sleep mode, while the above carrier control information makes the number of TBs to be transmitted more than the number of assigned component carriers to instruct the carriers so as to be additionally activated.

Since the number of assigned carriers is more increased, there is a need to update the DL-UL linkage information. The updated DL-UL linkage information may be transmitted through the separate message or may be included in the carrier control information.

The carrier control information may include the index of the added component carrier and/or the valid time. The added component carrier is activated for the valid time. Alternatively, the carrier control information includes the index of the added component carrier. In this case, when the index of the added component carrier is present in the carrier assignment information of the subsequent period, the continuously added component carrier may be activated and when the index of the added component carrier is not present in the carrier assignment information, the added component carrier may be deactivated.

The carrier assignment information may include the information on the activation/deactivation of the added component carrier by the carrier control information. The carrier control information includes the index of the added component carrier and includes a command instructing the component carrier added to the carrier assignment information of the subsequent period so as to be continuously activated or deactivated.

The UE may transmit the assignment request of the additional carrier to the base station. The base station may transmit the carrier control information to the UE as the response to the request of the UE.

The assignment request of the additional carrier may be transmitted to the base station by using the scheduling request of the 3GPP LTE. The UE may use some of the period and/or resources assigned to the scheduling request to transmit the assignment request of the additional carrier. For example, when transmitting the scheduling request in the specific subframe among the subframe that may transmit the scheduling request, the base station recognizes the transmitted scheduling request as the assignment request of the additional carrier.

Hereinafter, a method assigning the primary carrier will be described. The primary carrier is referred to as a reference carrier or an anchor carrier.

The primary carrier may be the DL CC that transmits at least any one of the system information, the common control information, the carrier assignment information, and the carrier control information. Alternatively, the primary carrier or the reference carrier may be the UL CC that transmits the uplink control information or the scheduling request. A pair of assigned DL CC and UL CC is referred to as a pair of CCs.

For the assignment of the primary carrier, the minimum number of primary carriers are assigned according to the capability of the UE and may be increased if necessary. Alternatively, one primary carrier is assigned regardless of the capability of the UE and may be increased if necessary.

The pair of first assigned CCs or the DC CC is configured as a first primary carrier. The first primary carrier may be configured by the carrier assignment information.

The base station communicates with the UE through the first primary carrier that is first assigned and then, the additional component carrier may be assigned using the carrier control information transmitted through the first primary carrier, if necessary. In this case, the number of added component carriers may be one or more.

When a sum of the first assigned DL CC and the additionally assigned DL CCs is n (n>2) or more, the n+1-th assigned CC is configured as the second primary carrier. That is, the first primary carrier is configured as the primary carrier for n CCs from 1 to n and the second primary carrier is configured as the primary carrier of n+1 or more CCs. For example, it is assumed that the first assigned DL CC and the additionally assigned one DL CC are present and the first assigned DL CC is the first primary carrier. If n=2, the third assigned CC is configured as the second primary carrier. As another example, it is assumed that n=3 and the first assigned DL CC and the additionally assigned two DL CCs are present. The fourth assigned CC is configured as the second primary carrier.

n for dividing the first primary carrier and the second primary carrier may be configured as the carrier aggregation capability of the UE. n may be transmitted through the upper layer signaling such as the RRC message. Alternatively, n may be fixed as the preset value according to the number of carriers supported.

Using the above-mentioned method, the first primary carrier is configured through the signaling and the remaining primary carriers are configured without the separate signaling, thereby reducing the signaling overhead.

After the first primary carrier is configured through the carrier assignment information, the remaining primary carrier may be configured through the above-mentioned carrier control information or the separate PDCCH and the MAC message.

The attributes of the first primary carrier and the remaining primary carrier may be changed. For example, the component carrier used for the first primary carrier is fixed, but the component carrier used for the remaining primary carrier may be changed. The component carrier used for the first primary carrier may be activated at all times, but the component carrier used for the remaining primary carrier may be activated or deactivated.

Meanwhile, when the UE is present in the DRX mode like the RRC idle state, the UE may be operated as follows.

First, the UE performs the PDCCH monitoring on all the carriers assigned to the UE. The power consumption of the UE is the highest, but the scheduling freedom of the base station is increased.

Second, the UE performs the PDCCH monitoring on one or more carrier having a special attribute similar to the primary carrier rather than performing the PDCCH monitoring on all the carriers assigned to the UE. The primary carrier is defined in advance, but the UE may monitor a smaller number of carriers to reduce the power consumption and the base station may more effectively use the downlink resources.

Third, the UE performs monitoring on the DL CC performing the communication with the base station immediately before the UE enters the RRC idle state.

Fourth, the UE optionally selects and monitors the carrier that is backward-compatible with the LTE. In this case, all of the DL-UL linkages configured in the UE are invalid.

Fifth, when the UE starts a random access process, the UL CC uses the UL CC linked with the monitored DL CC. In this case, the DL-UL linkage may apply the UE-specific DL-UL linkage or the cell-specific DL-UL linkage. During an initial access process like the random access process, the UE-specific DL-UL linkage is disregarded and the UE and the base station may use the same carrier configuration when the cell-specific DL-UL linkage is applied.

During a random access process, the UE and the base station may apply different DL-UL linkage according to the carrier aggregation. As the random access process, there are a non-contention based random access process using a dedicated preamble and a contention-based random access process using an optionally selected preamble. When using the contention based preamble, the UE may disregard the previously known UE-specific DL-UL linkage and apply the cell-specific DL-UL linkage. The reason is that the base station does not know which UE tries the random access. On the other hand, when using the dedicated preamble, the UE may apply the UE-specific DL-UL linkage. When the dedicated preamble is used to transmit other control information (for example, scheduling request, carrier aggregation change indicator, UE state change request, or the like) rather than the handover, the UE tries the random access by using the DL/UL CCs that are monitored or may be monitored.

Figure 17:
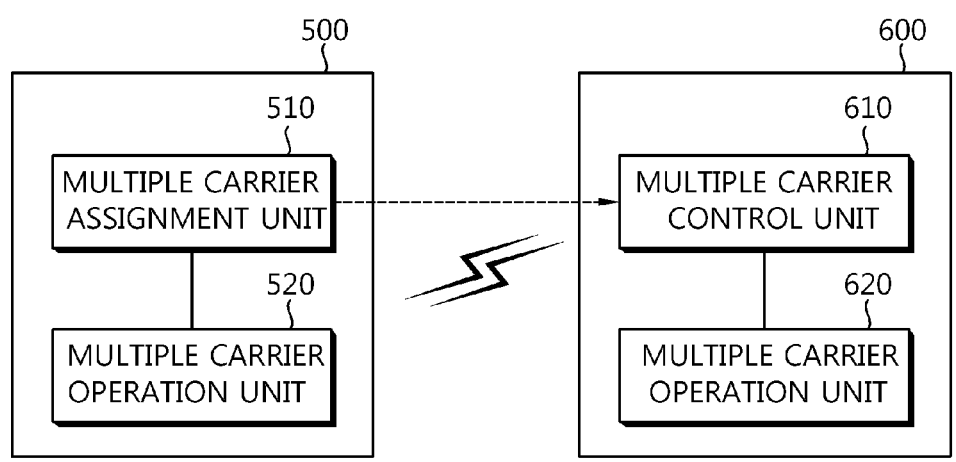
FIG. 17 is a block diagram showing a wireless communication system implementing the exemplary embodiments of the present invention.

FIG. 17 shows a block diagram showing a radio communication system implementing the exemplary embodiments of the present invention.

A carrier configuration device 500 includes a multiple carrier assignment unit 510 and a multiple carrier operation unit 520.

The multiple carrier assignment unit 510 manages a plurality of carriers and implements the above-mentioned carrier assignment method. In more detail, the multiple carrier assignment unit 510 configures the carrier assignment information and/or the carrier control information, which is in turn transmitted to a multiple carrier control device 600.

A multiple carrier operation unit 1212 communicates with the carrier control device 600 through a radio channel using the configured multi-carrier waves.

A carrier control device 600 includes a multiple carrier control unit 610 and a multiple carrier operation unit 620.

The multiple carrier control unit 610 manages a plurality of carriers and implements the above-mentioned carrier assignment method. In more detail, the multiple carrier control unit 610 receives the carrier assignment information and/or the carrier control information from the multiple carrier assignment unit 510 and uses the received the carrier assignment information and/or the carrier control information to operate the multiple carrier operation unit 620.

The multiple carrier operation unit 620 communicates with the carrier configuration device 500 through a radio channel using the configured multi-carrier waves.

The carrier configuration device 500 is a portion of the base station, which may be implemented by a processor (not shown) in the base station. The carrier control device 600 is a portion of the UE, which may be implemented by a processor in the UE.

The carrier configuration device 500 and the carrier control device 600 may be implemented by a software protocol. The protocol may be stored in a memory and executed by the processors.

In the above-mentioned exemplary system, methods have been described based on a flowchart as a series of steps or blocks. However, the present invention is not limited to the sequence of steps. That is, any step may be performed in a step and a sequence different from the above-mentioned step and sequence or several steps may be simultaneously performed. In addition, it may be appreciated by those skilled in the art that the steps shown in the flowchart are not exclusive and other steps may be added to the flowchart or at least one step may be deleted from the flowchart without departing from the scope of the present invention.

The exemplary embodiments of the present invention include various aspects of examples. Although all possible combinations for showing various aspects may not be described, those skilled in the art may appreciate that other combinations are possible. Therefore, modifications, additions and substitutions should also be understood to fall within the scope of the present invention.

The invention claimed is:

1. A method of controlling signals in a multiple carrier system, the method performed by a user equipment (UE) and comprising:

receiving, from a base station, assignment information indicating a plurality of component carriers, which are available to the UE, wherein the assignment information is received in a Radio Resource Control (RRC) message;

receiving, from the base station, a Medium Access Control (MAC) message indicating at least one component carrier selected among the plurality of component carriers and valid time information assigned for the at least one component carrier, wherein the MAC message has a logical channel identifier set to a 5-bit value of '11011';

in response to the MAC message, transmitting a reception acknowledgement to the base station, wherein the reception acknowledgement is not transmitted if the UE does not successfully receive the MAC message; and if the MAC message instructs the at least one component carrier to be activated, after waiting for a predetermined time, activating the at least one component carrier during an active time period determined based on the valid time information, and deactivating the at least one component carrier after the active time period, wherein the UE performs a blind decoding on a physical downlink control channel (PDCCH) and reports channel quality information (CQI) on a plurality of downlink sub-bands on a whole downlink band for the activated at least one component carrier, wherein the UE does not perform a blind decoding on the PDCCH and reports CQI only on the whole downlink band for the deactivated at least one component carrier, and wherein the predetermined time includes K orthogonal frequency division multiplexing (OFDM) subframes, wherein K is greater than or equal to 1.

2. The method of claim 1, further comprising:

if the MAC message instructs the at least one component carrier to be deactivated, after waiting for the predetermined time, deactivating the at least one component carrier during a de-active time period determined based on the valid time information, and activating the at least one component carrier after the de-active time period.

3. The method of claim 1, wherein the MAC message is received via a primary component carrier among the plurality of component carriers.

4. A user equipment (UE) in a multiple carrier system, the UE comprising:

a multiple carrier control unit configured to:

receive, from a base station, assignment information indicating a plurality of component carriers, which are available to the UE, wherein the assignment information is received in a Radio Resource Control (RRC) message;

receive, from the base station, a Medium Access Control (MAC) message indicating at least one component carrier selected among the plurality of component carriers and valid time information assigned for the at least one component carrier, wherein the MAC message has a logical channel identifier set to a 5-bit value of '11011';

in response to the MAC message, transmit a reception acknowledgement to the base station, wherein the reception acknowledgement is not transmitted if the UE does not successfully receive the MAC message; and if the MAC message instructs the at least one component carrier to be activated, after waiting for a predetermined time, activate the at least one component carrier during an active time period determined based on the valid time information, and deactivate the at least one component carrier after the active time period, wherein the UE performs a blind decoding on a physical downlink control channel (PDCCH) and reports channel quality information (CQI) on a plurality of downlink sub-bands on a whole downlink band for the activated at least one component carrier, wherein the UE does not perform a blind decoding on the PDCCH and reports CQI only on the whole downlink band for the deactivated at least one component carrier, and wherein the predetermined time includes K orthogonal frequency division multiplexing (OFDM) subframes, wherein K is greater than or equal to 1.

5. The UE of claim 4, wherein the multiple carrier control unit is further configured to:

if the MAC message instructs the at least one component carrier to be deactivated, after waiting for the predetermined time, deactivate the at least one component carrier during a de-active time period determined based on the valid time information, and activate the at least one component carrier after the de-active time period.

6. The UE of claim 4, wherein the MAC message is received via a primary component carrier among the plurality of component carriers.

* * * * *